Feb. 3, 1970  R. EVANS  3,492,791

POLYMERISATION APPARATUS AND PROCESS

Filed Nov. 15, 1967  5 Sheets-Sheet 1

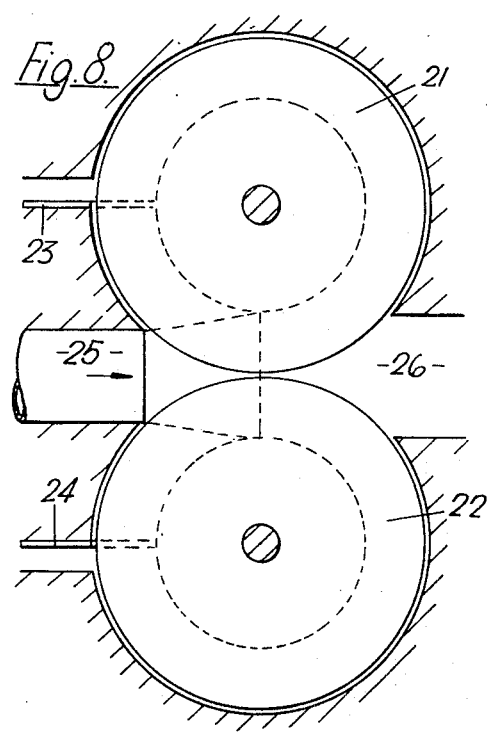
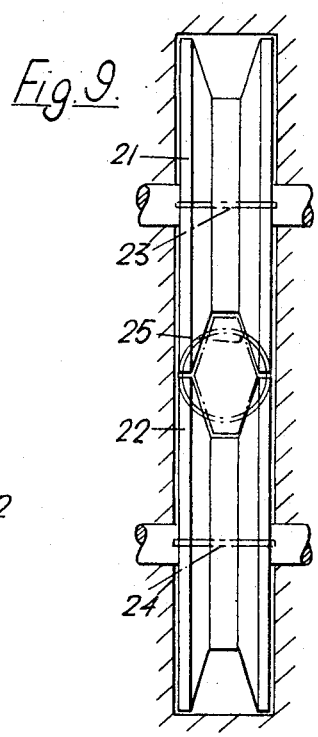
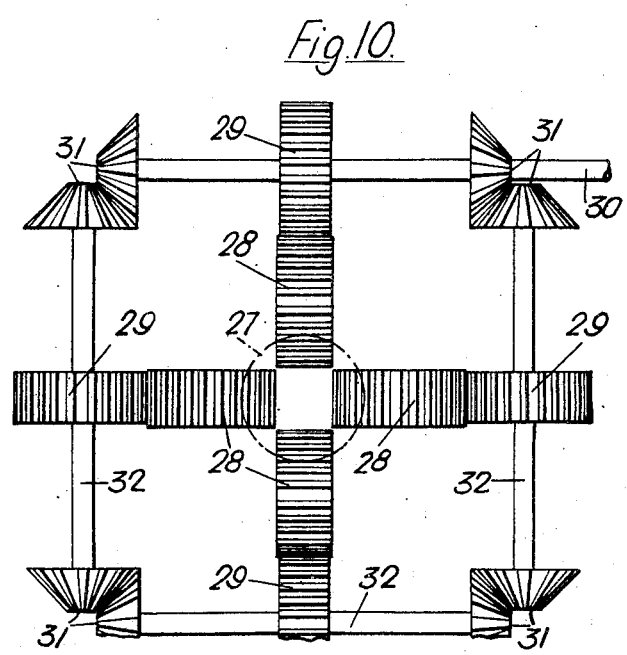

Feb. 3, 1970 R. EVANS 3,492,791
POLYMERISATION APPARATUS AND PROCESS
Filed Nov. 15, 1967 5 Sheets-Sheet 4
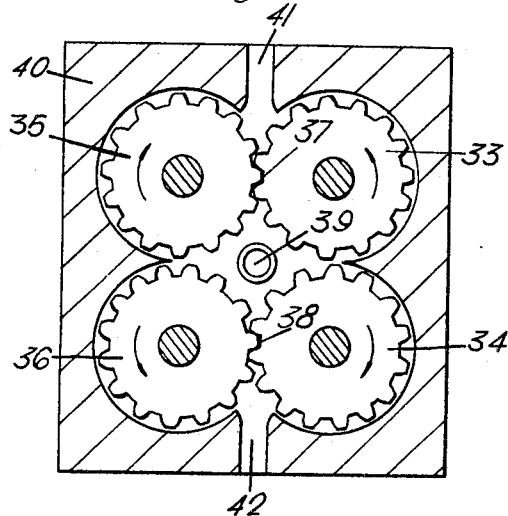
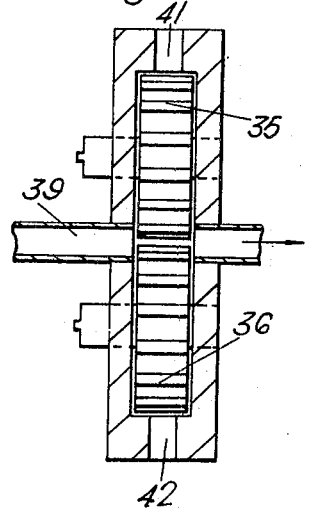

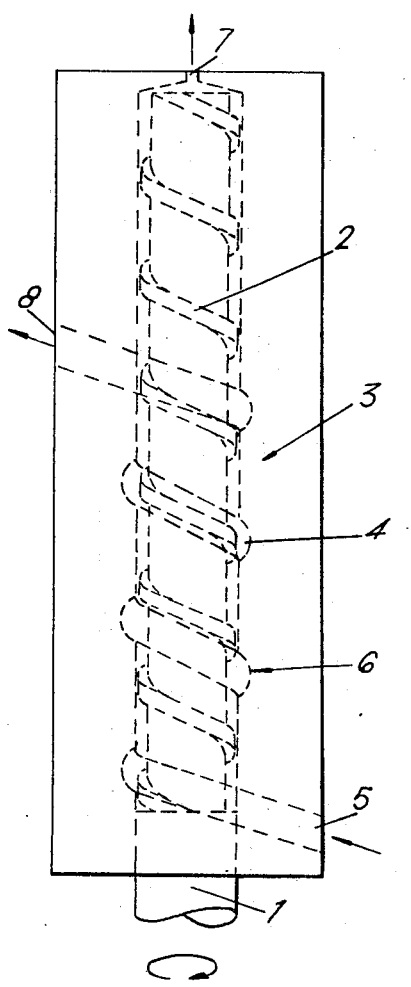

United States Patent Office 3,492,791
Patented Feb. 3, 1970

1

3,492,791
POLYMERISATION APPARATUS AND PROCESS
Ronald Evans, Pontypool, England, assignor to Imperial Chemical Industries Limited, London, England, a corporation of Great Britain
Filed Nov. 15, 1967, Ser. No. 683,364
Claims priority, application Great Britain, Nov. 30, 1966, 53,569/66
Int. Cl. B01d *19/00*
U.S. Cl. 55—36                            9 Claims

ABSTRACT OF THE DISCLOSURE

In a continuous polymerization process, an apparatus for separating steam or other gas from the molten polymeric material is provided comprising a conduit in which at least one moving member is provided which presents a surface in place of the conduit wall to accept the flowing polymeric material and transfers this surface, bearing the polymeric material outside the conduit therefore continuously replacing the surface by a fresh surface.

---

Figure 1:
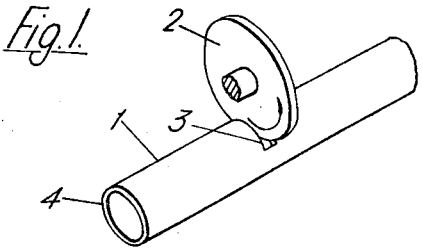

This invention relates to new and improved polymerisation apparatus for the continuous manufacture of high molecular weight polymeric fibre forming materials and particularly though not exclusively to a separator for piped streams of molten polyamide associated with steam.

In the manufacture of polyamides by a continuous process it not infrequently happens that the high molecular weight polyamide is obtained in molten form associated with steam, and it is necessary to separate the latter from the polyamide as they issue from the pipe. The steam may have arisen from moisture originally contained in the monomer starting materials, or it may have been chemically evolved in the polymerisation reaction, or it could have been introduced as a non-oxidising gaseous medium. It is to be understood that the steam commonly emerges from the pipe at high velocity. It is possible to conduct the polyamide and steam into a heated vented vessel, in the bottom of which the molten polyamide collects, to be removed as required, whilst the steam escapes by the vent. In practice, however, owing to the velocity with which the steam issues from the open end of the pipe, some of the polyamide is inevitably spattered on to the walls of the vessel, which become covered with a film thereof. Although it would be expected that this polyamide film, being above its melting point, would constantly run down into the polyamide pool below, parts of it at least accumulate for a sufficient time to produce an undesirable degree of degradation in the polyamide.

Various devices in the form of modified ends to the pipe have been proposed without affording a satisfactory solution to the problem of resolving the outflow into steam on the one hand and a quickly flowing stream of polyamide on the other.

This invention is based on the fact that the polyamide and steam move through the pipe in what is known as two-phase annular flow, by which is meant that the rather viscous molten polyamide flows along the inner surface of the pipe, constituting a cross-sectional annulus, while the steam passes down the centre (at a much greater linear velocity than the polyamide). It has now been found practicable to provide the pipe or conduit carrying the polyamide and steam with one or more portions of wall or confining member which are capable of being moved, together with the layer of polyamide carried thereon, outside the confines of the pipe, and replaced by fresh portions of wall. Thus the wall of the conduit is replaced to a greater or lesser extent by a moving member presenting a surface on to which the polyamide flows, said surface constantly moving outside the conduit with the polyamide on it, as its place is taken by a fresh surface. In this way the polyamide is removed from the conduit whilst the steam passes forward without hindrance.

Accordingly the invention relates to a separator for molten polymeric fibre forming material flowing, in association with steam or other gas, in a conduit in continuous polymerisation apparatus, which separator comprises at least one moving member which presents a surface in place of the conduit wall or a part thereof to accept the flowing polymeric material and transfers said surface, bearing the polymeric material outside the conduit, continuously replacing it by a fresh surface.

The separator is maintained at a temperature above the melting point of the polyamide by conventional means, e.g. jackets heated by electricity or by a vapour of diphenyl and diphenyl oxide.

The moving member mentioned may be made in many mechanical modifications. Instances of these are described below with reference to the accompanying diagrammatic drawings. Conveniently the moving member has an endless surface; the latter may be smooth e.g. the periphery of a roller, or an endless band, or else rugged or ridged, e.g. the toothed surface of a gear wheel. In the former case a sufficient gap must be provided between the moving surface and the conduit to permit the passage of the layer of polyamide borne on the surface. In the latter case, however, the gap is unnecessary because the polyamide is accommodated in the cavities of the rugged surface, e.g. between the teeth of the gear wheel. On emerging from the conduit the polyamide is detached from the surface of the moving member by suitable means. Thus in the case of a smooth surface an appropriate scraper can be employed. or a gear wheel an intermeshing gear is used to retrieve the polyamide from the wheel, by pressing it from between the teeth. Preferably a plurality of moving members is employed; they are usually placed at or near the end of the conduit.

There will now be described by way of example, convenient embodiments of the invention, this description referring to the drawings filed with the provisional specification. Although the embodiments are described with reference to polyamides, they could be employed for piped streams of other liquids and gases having similar physical properties to those of molten polyamides and steam and behaving in a similar manner.

FIGURE 1: Perspective view of a conduit with a transversely rotating roller.

Figure 2:
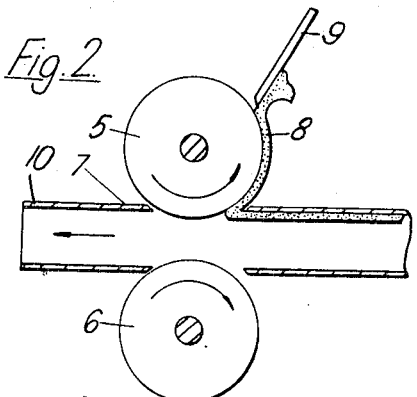

FIGURE 2: Sectional view of a conduit with a longitudinally rotating roller.

Figure 3:
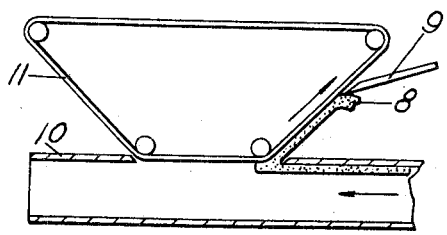

FIGURE 3: Sectional view of a square conduit with an endless belt.

Figure 4:
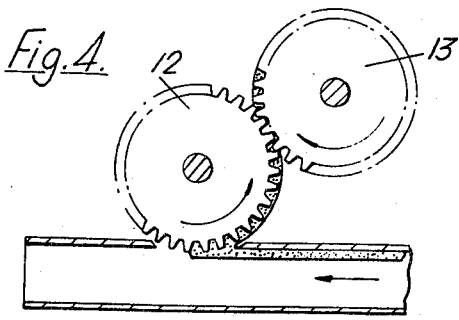

FIGURE 4: Fragmentary section of a conduit with paired gear wheels.

Figure 5:
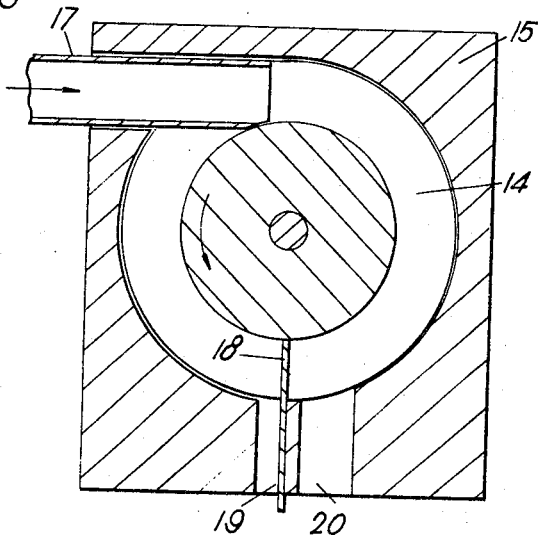

FIGURE 5: Sectional view of a conduit with grooved roller.

Figure 6:
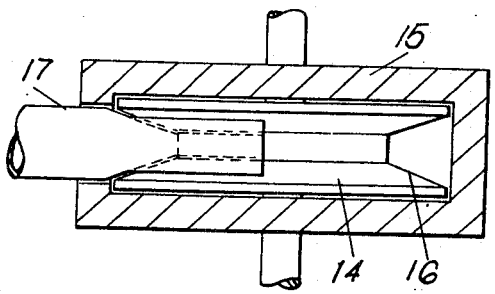

FIGURE 6: Top view of a conduit with grooved roller.

Figure 7:
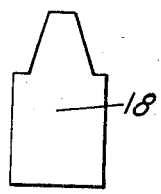

FIGURE 7: Scraper for roller in FIGS. 5 and 6.

FIGURE 8: Arrangement of conduit with two grooved rollers.

FIGURE 9: Side view of conduit with two grooved rollers.

FIGURE 10: Arrangement of four pairs of longitudinally rotating gear wheels.

FIGURE 11: Arrangement of two pairs of transversely rotating gear wheels.

FIGURE 12: Sectional view of the arrangement of gear wheels in FIGURE 11.

FIGURE 13 is a sectional diagrammatic view of an embodiment comprising a helical screw rotating inside a helically rifled barrel.

In FIGURE 1 the polyamide and steam flow from right to left in the circular cross-section conduit or pipe 1. A rotatnig roller 2 rotates in a slot 3 in the top of the pipe. That part of the roller within the pipe becomes coated with a layer of polyamide which is thus carried outside the pipe, the steam issuing from the open end thereof 4. The molten polyamide is collected by appropriate means not shown. There must be sufficient clearance between the roller and pipe to accommodate the emerging layer of polyamide. This clearance is illustrated in FIGURE 2 in the case of two rollers 5, 6 longitudinally arranged, that is to say, with their planes parallel to the length of the pipe 7. The polyamide (shown for convenience on one side of the pipe only) and steam flow is in the direction of the arrow, 8 is the layer of polyamide borne outside the conduit on the roller 5, whence it is removed by the scraper 9, whilst the steam issues at the end of the pipe 10. FIGURE 3 depicts the use of an endless belt 11 (instead of a roller) which forms part of one of the sides of the square conduit (the other numerals have the same significance as in FIGURE 2). FIGURE 4 illustrates the action of a gear wheel 12 which collects the polyamide between its teeth, whence it is expressed by the intermeshing gear wheel 13.

In FIGURES 5 and 6 the moving member takes the form of a grooved roller 14 which rotates in the housing 15, the surfaces of its groove 16 constituting a continuation of the conduit 17. The molten polyamide is carried back on the groove 16 until it meets the scraper 18 which causes it to flow out at the exit 19 whilst the steam issues at 20. FIGURE 7 shows a front view of the scraper 18 which is shaped to fit the groove 16.

Instead of one grooved roller, two grooved rollers 21, 22 fitted with scrapers 23, 24 can be applied to the end of the conduit 25 to remove the polyamide, whilst the steam passes straight on in the direction of the arrow 26, as illustrated in FIGURES 8 and 9.

A convenient arrangement of 4 pairs of gears (compare FIGURE 4) is shown in FIGURE 10, where 27 is the conduit, 28 the four gears removing the polyamide and 29 the four intermeshing gears which strip the polyamide from the teeth of the gears 28. The entire set of gears is conveniently driven from shaft 30 by means of the bevel gears 31 and the shafts 32.

In FIGURE 11 the principle of the gear wheel shown in FIGURE 4 is employed in the form of two pairs of wheels 33, 34, 35, 36 which mesh at 37, 38 and rotate in the direction of the arrows in a plane which is transverse to the conduit 39 supplying the molten polyamide and steam. The gear wheels are mounted in a casing 40 provided with outlets 41, 42 for the molten polyamide. FIGURE 12 is similarly numbered. The polyamide runs into the hollows between the teeth of the gear wheels and is carried round between the teeth and the casing until, at the point where the gears mesh it is pressed out into the outlets 41 and 42. The steam on the other hand proceeds straight through the centre of the separator issuing as indicated by the arrow in FIGURE 12.

FIGURE 13 illustrates a further, preferred, embodiment of the present invention. In this case a screw 1 having a helical groove 2 therein rotates within a barrel 3 with helical rifling 4 in its walls. The steam and polyamide mixture is fed into this apparatus at inlet 5. The steam having higher velocity, tends to move along the outside wall 6 of the rifling while the polyamide deposits in the helical groove 2 of the screw 1. The screw is rotated so as to carry the liquid polyamide to the outlet 7. The steam, largely concentrated in the rifling 4, is led off through the steam outlet 8. The "hands" of the screw and rifling may be the same or opposite.

What I claim is:

1. A separator for molten polymeric fibre forming material and steam or other gas from a continuous polymerization apparatus comprising a walled conduit means for conveying molten polymer from a continuous polymerization apparatus means for forcing said polymer in a flowing relationship against and along a wall of said conduit, said conduit having at least one moving member which presents a surface in place of said conduit wall to accept said flowing polymer, said moving member communicating with the exterior of said conduit to transfer said molten polymer to the outside of said conduit and away from said gas, means for continuously replacing said surface with a fresh surface and means other than said surface for exhausting said gas from said conduit.

2. A separator as claimed in claim 1 in which the moving member is a helically grooved screw rotating within a helically rifled barrel.

3. A separator as claimed in claim 1 in which the moving member has an endless surface.

4. A separator as claimed in claim 3 in which the endless surface is rugged or ridged.

5. A separator as claimed in claim 4 in which the endless surface is afforded by the perimeter of a gear wheel.

6. A process for separating a molten fibre forming polymeric material from a gas comprising conveying a molten polymer in association with a gas in a flowing relationship along a separation zone wherein said gas is maintained at a higher linear velocity than said polymer and wherein said gas sustains the flow of said polymer forcing said polymer to the sidewall of said separation zone, continuously presenting a moving surface to the wall of said separation zone to accept molten polymer thereon, conveying said surface with said molten polymer out of said separation zone, collecting removed polymer as a molten mass and exhausing said gas from said separation zone away from said polymer.

7. The process of claim 6 wherein the gas is steam.

8. The process of claim 6 wherein the polymer is fibre forming polyamide.

9. The process of claim 6 wherein the polymer is fibre forming polyester.

References Cited

UNITED STATES PATENTS

| | | |
|---|---|---|
| 2,371,916 | 4/1943 | Rodenacker. |
| 2,782,843 | 2/1957 | Rodenacker _____ 159—11 |
| 2,804,920 | 9/1957 | Perkins et al. _____ 159—11 |
| 3,031,433 | 4/1962 | Monroe. |

REUBEN FRIEDMAN, Primary Examiner

T. A. GRANGER, Assistant Examiner